000
United States Patent

Takatani

(10) Patent No.: US 9,349,084 B2
(45) Date of Patent: May 24, 2016

(54) IMAGE FORMING APPARATUS, NON-TRANSITORY COMPUTER-READABLE STORAGE MEDIUM AND METHOD FOR MONITORING ERROR IN CENTRAL PROCESSING UNIT AND PERFORMS RESETTING PROCESS

(71) Applicant: CANON KABUSHIKI KAISHA, Tokyo (JP)

(72) Inventor: Tamotsu Takatani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/468,207

(22) Filed: Aug. 25, 2014

(65) Prior Publication Data

US 2015/0062614 A1 Mar. 5, 2015

(30) Foreign Application Priority Data

Sep. 2, 2013 (JP) ................................. 2013-181349

(51) Int. Cl.
| | | |
|---|---|---|
| *G06K 15/02* | (2006.01) | |
| *G06K 15/22* | (2006.01) | |
| *G06K 15/00* | (2006.01) | |
| *G03G 15/00* | (2006.01) | |
| *H04N 1/32* | (2006.01) | |

(52) U.S. Cl.
CPC .............. *G06K 15/408* (2013.01); *G03G 15/00* (2013.01); *G06K 15/40* (2013.01); *H04N 1/32587* (2013.01); *H04N 1/32593* (2013.01)

(58) Field of Classification Search
None
See application file for complete search history.

(56) References Cited

U.S. PATENT DOCUMENTS

| 2007/0073957 | A1* | 3/2007 | Fukui et al. ................... 710/311 |
| 2012/0191999 | A1* | 7/2012 | Takatani ....................... 713/323 |
| 2013/0010318 | A1* | 1/2013 | Goda ........................... 358/1.13 |
| 2013/0047019 | A1* | 2/2013 | Higashi ......................... 713/323 |

FOREIGN PATENT DOCUMENTS

JP  H04-33138 A  2/1992

* cited by examiner

*Primary Examiner* — Benny Q Tieu
*Assistant Examiner* — Haris Sabah
(74) *Attorney, Agent, or Firm* — Canon U.S.A., Inc. IP Division

(57) ABSTRACT

In an image forming apparatus in which a first board including a first central processing unit (CPU) and a second board including a second CPU communicate with each other to control image processing, a monitoring unit monitors whether processing executed by the second CPU is normal. If the monitoring unit determines that the processing executed by the second CPU is not normal, a notification unit notifies the first CPU. The first CPU resets the second board according to the notification.

3 Claims, 3 Drawing Sheets

IMAGE FORMING APPARATUS, NON-TRANSITORY COMPUTER-READABLE STORAGE MEDIUM AND METHOD FOR MONITORING ERROR IN CENTRAL PROCESSING UNIT AND PERFORMS RESETTING PROCESS

BACKGROUND OF THE INVENTION

1. Field of the Invention

The present invention relates to an image forming apparatus, a method for controlling the image forming apparatus, and a storage medium.

2. Description of the Related Art

In an image forming apparatus including a central processing unit (CPU) on each of a main board and a sub-board, device control and image processing, which require real time processing, are performed on the sub-board side. Devices such as a printer, a scanner, and a facsimile are controlled on the sub-board side. In a case where an operational failure occurs in software on the sub-board side during control of a device, the device cannot be controlled at desired timing.

When a device in operation cannot be controlled, the device needs to be stopped immediately. To stop the device, a function of a watchdog timer installed on the sub-board side is used. The watchdog timer is regularly cleared within a certain time period defined by the software. However, in case of the software failure, this clear operation cannot be performed. When a predetermined time period has elapsed, the hardware is reset. The resetting of the hardware resets a device control module, thereby stopping the operation of the device.

Japanese Patent Application Laid-Open No. 4-33138 discusses a technique applied to a multi-CPU system including a main board and a sub-board. According to the technique, when it is detected that the CPU on the sub-board side is out-of-control, the sub-board side is automatically rebooted.

However, when the sub-board side is reset using a watchdog timer, the main board side cannot recognize the presence of the sub-board side, thereby resulting in an error. Such a software failure on the sub-board side cannot be predicted by the main board side, and also the main board side cannot receive a prior notification from the sub-board side. Consequently, the main board side cannot execute appropriate processing.

SUMMARY OF THE INVENTION

The present invention is directed to a configuration in which a main board detects a transition of data processing by a sub-board to an abnormal state and then starts reboot processing.

According to an aspect of the present invention, an image forming apparatus, in which a first board including a first CPU and a second board including a second CPU communicate with each other to control image processing, includes a monitoring unit configured to monitor whether processing executed by the second CPU is normal, and a notification unit configured to notify the first CPU when the monitoring unit determines that the processing executed by the second CPU is not normal. The first CPU resets the second board according to the notification from the notification unit.

Further features of the present invention will become apparent from the following description of exemplary embodiments with reference to the attached drawings.

DESCRIPTION OF THE EMBODIMENTS

Various exemplary embodiments, features, and aspects of the invention will be described in detail below with reference to the drawings.

<System Configuration>

Figure 1:
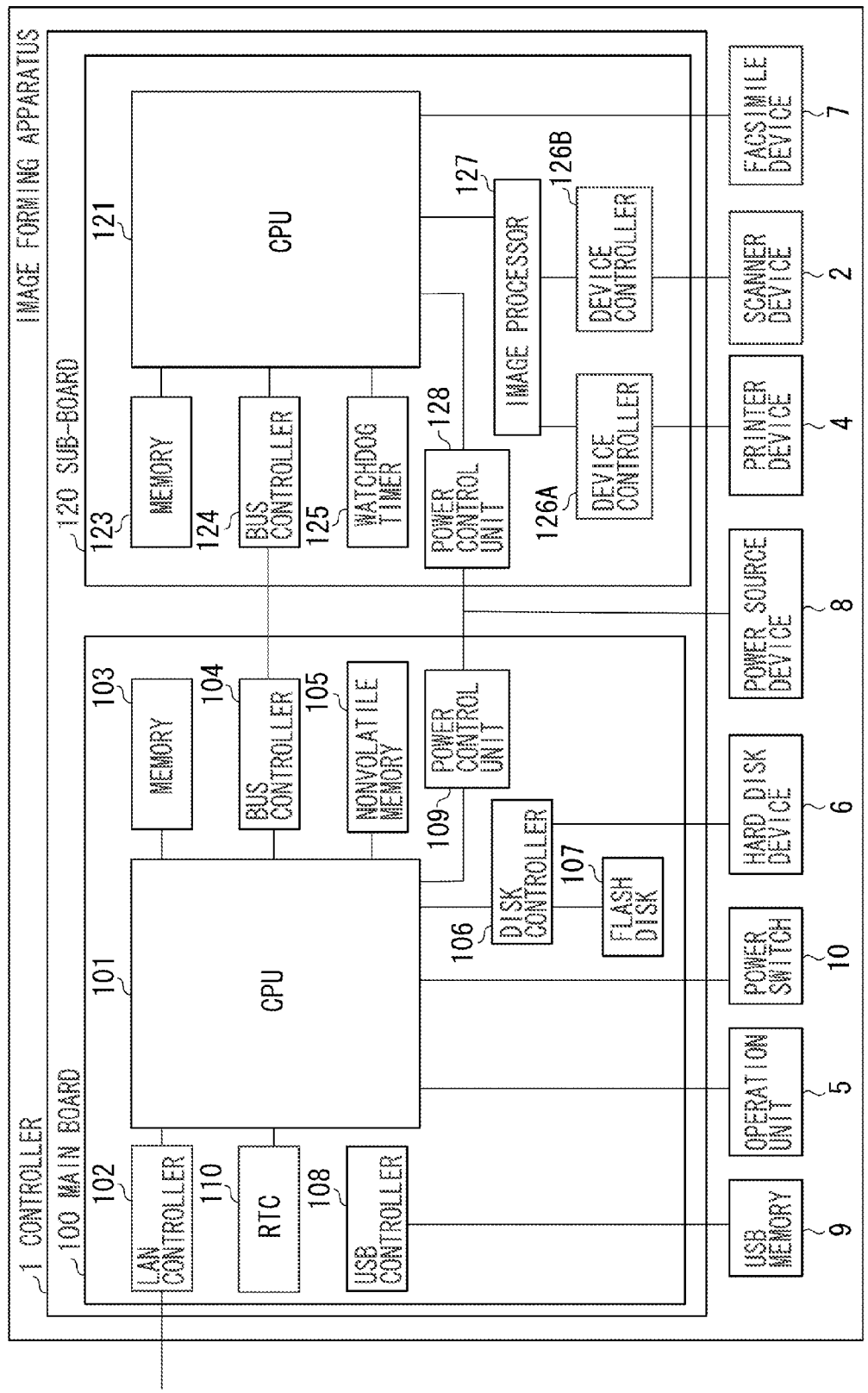
FIG. 1 is a block diagram illustrating a configuration of an image forming apparatus.

FIG. 1 is a block diagram illustrating a configuration of an image forming apparatus according to a first exemplary embodiment of the present invention. The present exemplary embodiment describes an example of an image forming apparatus in which a main board 100 and a sub-board 120 communicate with each other to control a device for performing image forming processing. In the present exemplary embodiment, a multifunction peripheral (MFP) having a print function, a scanner function, a copy function, and a send function is used as an example of the image forming apparatus.

In FIG. 1, the main board 100 includes a general-purpose CPU system. A CPU 101 controls the entire main board 100. A local area network (LAN) controller 102 communicates with an external device via a network. A memory 103 is used as a work memory by the CPU 101. A bus controller 104 functions as a bridge between the main board 100 and an external bus. A nonvolatile memory 105 stores various information set in the image forming apparatus. Even when the power is shut down, the various information remains stored in the nonvolatile memory 105. A real time clock (RTC) 110 keeps track of the current time. Even when the power is turned off, the RTC 110 continues to track the time using a battery.

A disk controller 106 controls reading/writing of data from/to a storage device. A flash disk 107 ((solid-state drive (SSD)) serving as a storage device includes a semi-conductor device, and has relatively small capacity. A universal serial bus (USB) controller 108 controls data access to a USB.

The main board 100 is externally connected to a USB memory 9, an operation unit 5, and a hard disk device 6. The hard disk device 6 is not necessarily a hard disk as long as it is a storage device. The hard disk drive 6 can be any type of nonvolatile storage device.

The sub-board 120 includes a relatively small general-purpose CPU system and image processing hardware.

The sub-board 120 includes a CPU 121 that controls the entire sub-board 120. A memory 123 is used as a work memory by the CPU 121. A bus controller 124 functions as a bridge between the sub-board 120 and an external bus. A watchdog timer (WDT) 125 counts to monitor the CPU 121 on the sub-board 120 that is executing a program. If the WDT 125 expires, the WDT 125 transmits an interrupt request to the main board 100. An image processor 127 uses the memory 123 to perform predetermined image processing suitable for each of a printer device 4, a scanner device 2, and a facsimile device 7. A device controller 126A is connected to the printer device 4, whereas a device controller 126B is connected to the scanner device 2.

The scanner device 2 and the printer device 4 transmit and receive digital image data through the device controllers 126B and 126A, respectively. The facsimile device 7 is directly controlled by the CPU 121. A power source device 8 supplies power to the main board 100 and the sub-board 120. Power control units 109 and 128 manage the power supply so that power is supplied to each of units requiring power on the main board 100 and the sub-board 120, respectively.

A power switch 10 receives operations of power on and off from a user. When the power switch 10 is operated by the user, the CPU 101 receives an interrupt. Upon detection of the interrupt, the CPU 101 controls the power control unit 109 according to a state thereof. Moreover, the CPU 121 detects the operations of the power switch 10 through the bus controllers 104 and 124 to control the power control unit 128.

For example, each of the CPU 101 and the CPU 121 includes a plurality of pieces of CPU peripheral hardware such as a chip set, a bus bridge, and a clock generator. However, such hardware is omitted in the block diagram illustrated in FIG. 1 for the sake of simplicity. Moreover, an exemplary embodiment of the present invention is applied to the configuration illustrated in FIG. 1, but not limited thereto.

Hereinafter, an operation performed by a controller 1 in the image forming apparatus according to the present exemplary embodiment will be described. Specifically, the present exemplary embodiment describes the operation performed during image processing in which an image of a document read from the scanner device 2 is copied to a sheet fed by the printer device 4.

When a user issues an instruction for copying an image using the operation unit 5, the CPU 101 transmits an image reading command to the scanner device 2 through the CPU 121. The scanner device 2 optically scans the document to convert it into digital image data, and inputs the digital image data to the image processor 127 through the device controller 126B. The image processor 127 transfers the digital image data to the memory 123 using directly memory access (DMA) through the CPU 121 so that the digital image data is temporarily stored in the memory 123.

When the CPU 101 confirms that a certain amount or all of the digital image data has been transferred to the memory 123, the CPU 101 issues an image output instruction to the printer device 4 through the CPU 121. The CPU 121 notifies the image processor 127 of a position (an address) of the image data in the memory 123. According to a synchronization signal from the printer device 4, the image data in the memory 123 is transmitted to the printer device 4 through the image processor 127 and the device controller 126A. The printer device 4 prints the digital image data on the sheet. The printer device 4 according to the present exemplary embodiment can employ any type of printing method, such as an electrophotographic method or an inkjet method.

Herein, if the user performs a setting to print a plurality of copies using the operation unit 5, the CPU 101 can store the image data of the memory 123 into the hard disk device 6. In this way, the CPU 101 can transmit the image data to the printer device 4 without receiving the image data from the scanner device 2 for a second or subsequent copy.

When the block of the controller 1 of the image forming apparatus is on standby, the power supply to the printer device 4 and the scanner device 2 is stopped until a job involving a print operation or a scanner operation is received from the user. Upon receipt of a job from the user using the operation unit 5, the CPU 101 determines whether the received job requires a printer function. If the job requires the printer function, the power supply to the printer device 4 and the scanner device 2 is started under the control of the power control unit 128. Then, the printer device 4 and the scanner device 2 are initialized. When the initialization of the printer device 4 and the scanner device 2 is completed, the job input by the user using the operation unit 5 is executed. When a certain time has elapsed after completion of the job, the controller 1 is put on standby, again. Accordingly, the power supply to the printer device 4 and the scanner device 2, which was started at the time of job execution, has been stopped.

Figure 2:
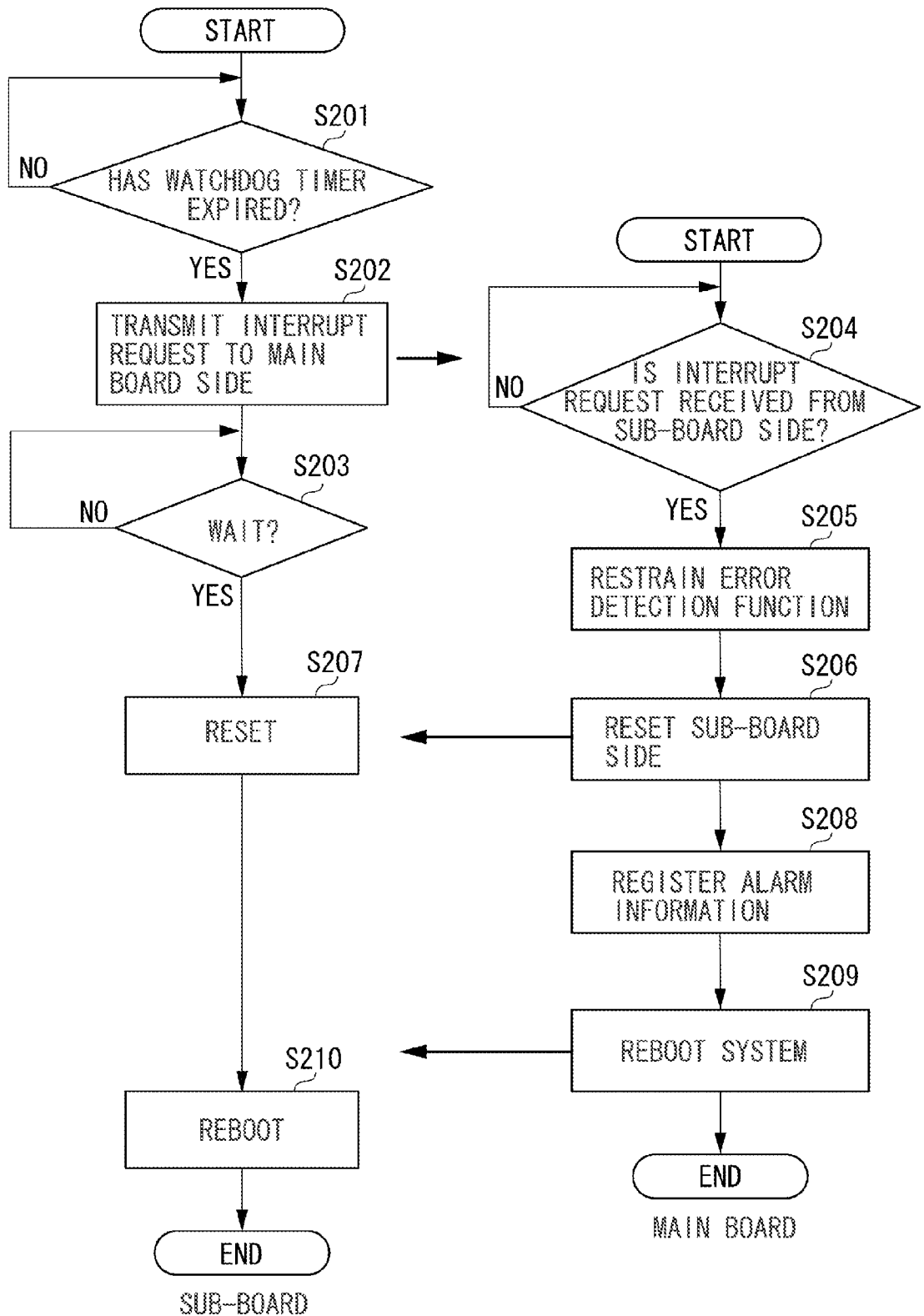
FIG. 2 is a flowchart illustrating a method for controlling the image forming apparatus.

FIG. 2 is a flowchart illustrating a method for controlling the image forming apparatus according to the present exemplary embodiment. In particular, data processing between the main board 100 and the sub-board 120 of the image forming apparatus illustrated in FIG. 1 will be described with reference to FIG. 2. In FIG. 2, each of steps performed by the CPU 101 on the main board 100 is illustrated on the right, whereas each of steps performed by the CPU 121 on the sub-board 120 is illustrated on the left. In the main board 100, the CPU 101 executes a control program loaded into the memory 103 to perform each of the steps. Similarly, in the sub-board 120, the CPU 121 executes a control program loaded into the memory 123 to perform each of the steps.

In step S201, the CPU 121 determines whether a count time defined beforehand by the WDT 125 has expired. If the CPU 121 determines that the count time has expired (YES in step S201), the processing proceeds to step S202. If the CPU 121 determines that the count time has not expired (NO in step S201), the CPU 121 repeats the processing in step S201. In a case where the CPU 121 on the sub-board 120 is operating normally, the WDT 125 is regularly cleared. Hence, the count time does not expire.

On the other hand, in a case where the CPU 121 on the sub-board 120 is not operating normally for some reason, the WDT 125 cannot be cleared. Thus, the defined time will expire.

Herein, in a case where a general WDT is used, the CPU 121 on the sub-board 120 is reset when the general WDT expires. Accordingly, in the image forming apparatus including the main board 100 and the sub-board 120, prior notification of such a failure cannot be transmitted from the sub-board 120 to the main board 100 and thereby resulting in an error.

In the present exemplary embodiment, in step S202, the WDT 125 transmits a notification to the CPU 101 on the main board 100 through the bus controllers 124 and 104. Generally, the notification is transmitted in the form of an interrupt request from hardware. However, as long as the notification is transmitted to the main board 100, any method can be used. Subsequently, in step S203, the CPU 121 is put in a wait state. If a reset notification is received from the main board 100 (YES in step S203), the CPU 121 comes out of the wait state. Then, the processing proceeds to step S207.

In step S204, the CPU 101 on the main board 100 determines whether the interrupt request transmitted in step S202 from the sub-board 120 is received. If the CPU 101 determines that the interrupt request is received (YES in step S204), the processing proceeds to step S205. If the CPU 101 determines that the interrupt request is not received (NO in step S204), the CPU 101 repeats the processing in step S204.

In step S205, the CPU 101 on the main board 100 restrains the error detection function of the entire system. Generally, in a case where a failure occurs in software operated on the CPU 121, the CPU 101 detects such a failure as an error. However, after step S204, the CPU 101 restrains the processing to be performed when such an error occurs. Examples of the error restraint include not displaying an error on the operation unit 5, and not storing an error history internally.

In step S206, the CPU 101 on the main board 100 outputs a reset instruction so that the hardware of the sub-board 120 is reset by stopping the power supply through the power control units 109 and 128. Herein, the device controllers 126A and 126B controlled by the CPU 121 on the sub-board 120 are also reset, thereby stopping the devices connected to the device controllers 126A and 126B. In step S207, the power control unit 128 resets the sub-board 120.

Accordingly, the main board 100 can ensure that a transition of the data processing by the sub-board 120 to an abnormal state is identified and then reboot processing for the entire system including the sub-board 120 is started.

In step S208, the CPU 101 on the main board 100 registers alarm information in a secured area of the nonvolatile memory 105, the alarm information indicating that a failure has occurred in the software operated on the CPU 121 and the WDT 125 has expired. A serviceman can later check the failure by referring to this history.

In step S209, the CPU 101 on the main board 100 reboots the entire system of the controller 1. In step S210, the sub-board 120 can also be rebooted normally by rebooting the controller 1 by the CPU 101 on the main board 100 in step S209. That is, in a case where the sub-board 120 becomes out of control while executing a program, the main board 100 can identify the state of the sub-board 120 to securely reset the sub-board 120, and can also start appropriate reboot processing on the entire system.

Figure 3:
FIG. 3 illustrates an example of a user interface (UI) screen displayed on an operation unit of the image forming apparatus illustrated in FIG. 1.

FIG. 3 illustrates an example of a user interface (UI) screen 301 displayed on the operation unit 5 of the image forming apparatus illustrated in FIG. 1. This is an example of a screen displayed on the operation unit 5 by the CPU 101 when the flowchart illustrated in FIG. 2 is executed. In a case where a software failure occurs in the CPU 121 on the sub-board 120, it is difficult for the user to identify what happened. Accordingly, the user needs to be notified of the failure via the operation unit 5 as illustrated in FIG. 3.

Hereinafter, a second exemplary embodiment will be described. In the above exemplary embodiment, the case in which the CPU 101 on the main board 100 reboots the entire system has been described in step S209 in the flowchart illustrated in FIG. 2. This operation is performed to return the system to normal, and is intended for a system that cannot be restored without rebooting the entire system including the main board 100 and the sub-board 120.

However, if the entire system can be restored by rebooting only the sub-board 120, in step S209, only the sub-board 120 may be controlled to be rebooted.

Therefore, the operation performed by the CPU 121 on the sub-board 120 in step S207 of the flowchart illustrated in FIG. 2 may not be necessary.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the above-described exemplary embodiments, when the main board 100 detects a transition of the data processing by the sub-board 120 to an abnormal state, the main board 100 can start reboot processing.

This application claims the benefit of Japanese Patent Application No. 2013-181349 filed Sep. 2, 2013, which is hereby incorporated by reference herein in its entirety.

What is claimed is:

1. An image processing apparatus in which a first board including a first central processing unit (CPU) and a second board including a second CPU communicate with each other to control image processing, wherein the first CPU transmits an instruction related to image processing to the second CPU, and the second CPU performs image processing according to the instruction from the first CPU, using a scanner or a printer, the image processing apparatus comprising:

one or more processors; and
one or more computer-readable media storing instructions that, when executed by the one or more processors, cause the one or more processors to perform operations comprising:
monitoring whether the second CPU is operating normally, wherein the monitoring is performed using a watchdog timer;
displaying a message that the image processing apparatus is to be rebooted, when the second CPU is not operating normally;
notifying the first CPU of an interrupt request when the second CPU is not operating normally; and
causing the first CPU to reset the second board by stopping power supply to the second CPU, according to the notification,
wherein, when the first CPU receives the notification, the first CPU restrains error processing, and, after resetting the second board, the first CPU stores, in a memory on the first board, information indicating a failure occurred in the second CPU, and
wherein the first CPU reboots the first board after resetting the second board, and wherein, when the first board is rebooted, the second board is also rebooted.

2. A method for controlling an image processing apparatus in which a first board including a first central processing unit (CPU) and a second board including a second CPU communicate with each other to control image processing, wherein the first CPU transmits an instruction related to image processing to the second CPU, and the second CPU performs image processing according to the instruction from the first CPU, using a scanner or a printer, the method comprising:

monitoring whether the second CPU is operating normally, wherein the monitoring is performed using a watchdog timer;
displaying a message that the image processing apparatus is to be rebooted, when the second CPU is not operating normally;
notifying the first CPU of an interrupt request when the second CPU is not operating normally; and
causing the first CPU to reset the second board by stopping power supply to the second CPU, according to the notification;
wherein, when the first CPU receives the notification, the first CPU restrains error processing, and, after resetting the second board, the first CPU stores, in a memory on the first board, information indicating a failure occurred in the second CPU, and wherein the first CPU reboots the first board after resetting the second board, and wherein, when the first board is rebooted, the second board is also rebooted.

3. A non-transitory computer-readable storage medium storing a program for causing a computer to execute a method for controlling an image processing apparatus in which a first board including a first central processing unit (CPU) and a second board including a second CPU communicate with each other to control image processing, wherein the first CPU transmits an instruction related to image processing to the second CPU, and the second CPU performs image processing according to the instruction from the first CPU, using a scanner or a printer, the method comprising:

monitoring whether the second CPU is operating normally, wherein the monitoring is performed using a watchdog timer;

displaying a message that the image processing apparatus is to be rebooted, when the second CPU is not operating normally;

notifying the first CPU of an interrupt request when the second CPU is not operating normally; and causing the first CPU to reset the second board by stopping power supply to the second CPU, according to the notification, wherein, when the first CPU receives the notification, the first CPU restrains error processing, and, after resetting the second board, the first CPU stores, in a memory on the first board, information indicating a failure occurred in the second CPU, and wherein the first CPU reboots the first board after resetting the second board, and wherein, when the first board is rebooted, the second board is also rebooted.

* * * * *